Nov. 5, 1968    J. V. DELFOSSE    3,408,819
STABILISING UNDERWATER SURFACE
Filed June 16, 1966
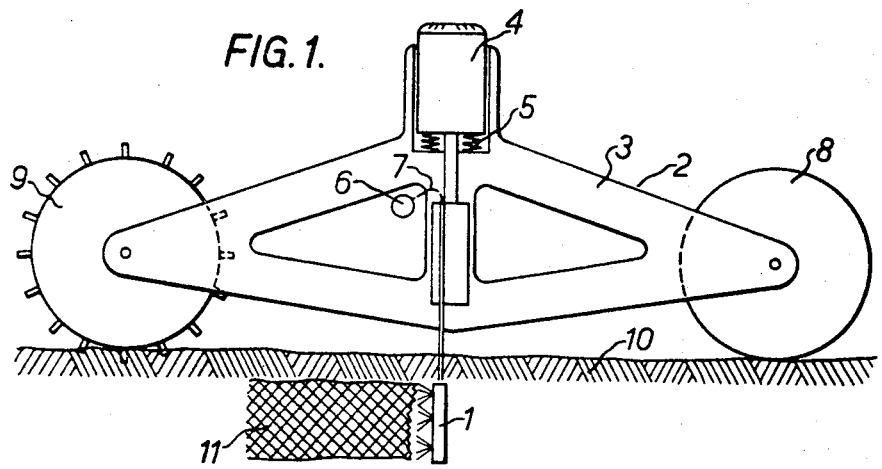
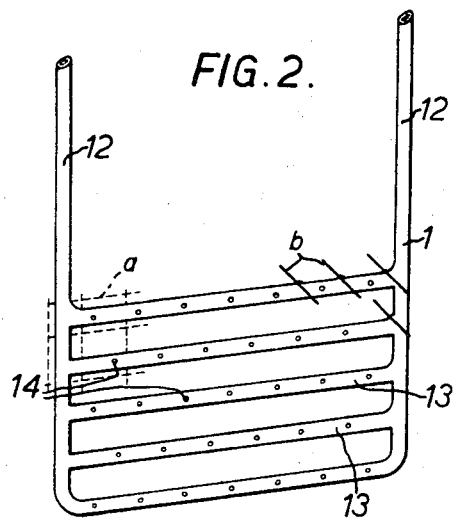

United States Patent Office 3,408,819
Patented Nov. 5, 1968

3,408,819
STABILISING UNDERWATER SURFACE
Joseph V. Delfosse, Bercham-Antwerp, Belgium, assignor to Esso Research and Engineering Company, a corporation of Delaware
Filed June 16, 1966, Ser. No. 558,067
Claims priority, application Great Britain, June 17, 1965, 25,715/65
15 Claims. (Cl. 61—35)

This invention relates to compacting substantially non-cohesive materials, such as granular or powdery materials, for example, sand, coal fines and sawdust.

According to the invention non-cohesive material, disposed below a liquid medium is fluidised, e.g. by the direct application of a vibrating means thereto, and fluid binding material applied directly thereto whilst the non-cohesive material is in a fluidised state.

The invention, although not limited thereto, is particularly useful for the stabilization of underwater beds of non-cohesive materials such as the beds of estuaries, canals and rivers where they are substantially sandy in nature and the invention is particularly described with reference to this application.

Amongst methods heretofore employed for the stabilisation of sandy beds of watercourses, have been to tip relatively heavy materials, such as boulders, or to sink mats of various materials, on the bed of the watercourse. Methods such as these are time consuming laborious and expensive and alternative methods have been sought. Amongst these alternative methods have been to apply sand bitumen mixtures to the watercourse beds as a binding medium; accordingly a hot asphalt mastic comprising sand, a filler and bitumen has been tipped on to the bed of the watercourse in the form of a hot slurry. In another method, sand mixed with bitumen emulsion has been passed through a conduit on to the watercourse. In a still further method, sand already present on the underwater bed, is thrown up by means of a scarifying device, for example a rotating shaft provided with blades, forming an aqueous suspension, and bitumen emulsion applied to the suspended sand. Many of the methods not only involve the labour and expense of providing all the materials for the stabilising surface from sources external to the bed to be treated, and transporting these to the site where they are to be used, but other objections arise in that part of the prepared surface material may be washed away during application; also there are difficulties in applying the stabilising material exactly where required and in procuring effective cohesion between the separately formed stabilising material and the bed of the surface to which it is to be applied. We have found that, where bitumen emulsion is applied to an aqueous suspension of sand, the large volume of water causes very poor cohesion to be obtained, since coated sand particles, settling from a large volume of water, do not cohere very well and also a large proportion of the emulsion is lost by dilution in the water before it is able to break on the sand particles.

The present invention provides an improved method of, and means for, stabilising underwater beds in which the stabilising bed is prepared by applying a binding material, e.g. bitumen or bitumen emulsion, in situ, directly to the watercourse bed material to be stabilised. In accordance with the invention, sand or other non-cohesive material which forms the underwater surface layer of the watercourse bed, is submitted to a high frequency vibration causing a fluidised bed effect and, whilst the medium is vibrating, binding material, suitably an acidic bitumen emulsion, is applied to the fluidised material to bind it and form a stabilised mass. The binding material is applied to the top layer of the bed and preferably to a small depth below the bed/water interface so that disturbance of the water is minimised and the binder is applied directly to the bed material. Also, by applying the binder below the surface of the bed, the likelihood of escape of binding material into the overlying water or other liquid, which would result in loss of binder and pollution of the liquid, is minimised.

Any suitable means for producing the required high frequency vibration to the watercourse bed may be employed, preferably one that is readily moved forward in order that treated material, e.g. sand, may settle in position so that the stabilised bed is formed in a continuous manner. In an example form of the invention a rigid vibrating frame in the form of a metal screen or grid may be used as the vibrating medium. Such a screen is readily introduced into non-cohesive material such as underwater sand and can be moved forward in the sand layer with a surprisingly low resistance. Experiments carried out in glass tanks provided with a bed of sand lying under water show that when the frame is caused to vibrate it creates, in its immediate vicinity, a cavity of fluidised sand comprising a loose suspension of the sand. When the vibrating frame is displaced, e.g. from left to right, sand particles on the right hand side become fluidised whilst those on the left hand side become quiescent. The system behaves as though the frame were moving in a liquid phase. By selecting suitable conditions such as frequency and amplitude of screen vibration, it is possible to maintain a fluidised cavity below the sand/water interface whilst the water remains undisturbed, or only slightly disturbed. This is important in avoiding, or reducing, loss of binding material applied for binding the sand. A binder, e.g. an acid bitumen emulsion, is injected into the vibrating cavity; the bitumen is effectively dispersed between the sand particles and breaks upon the particles to form a coherent mass which becomes compacted by the vibratory effect and, as the vibrating means moves away, leaves behind a stabilised sand bed. The binder may be introduced by any suitable means such as through a pipe or pipes equipped with spray jets or nozzles. The binder supply pipe is preferably connected to the vibrating screen and binder material delivered through nozzles or orifices in the screen. The screen, which may be in the form of a frame, and may be provided with a grid, and/or with projections such as needles or rods, is preferably arranged vertically to the bed to be stabilised. The ratio of binder to sand or other surface material may be varied by varying the displacement rate of the vibrating means or by varying the volume of injected binder, or both.

EXAMPLE

To a sand having the following particle size viz:

0.2% retained on a sieve of 420 microns
33% retained on a sieve of 177 microns
99% retained on a sieve of 74 microns was introduced a screen which was caused to vibrate at a frequency of 1000 vibrations/minute. At this frequency the fluidising effect was readily obtained and effective stabilisation followed the introduction of acid bitumen emulsion thereto. The frequency was increased up to 3000 vibrations/minute with progressive increase in the fluidising effect. The amplitude of the vibrations was 12.5 mm.

The invention is further illustrated by reference to the accompanying drawings wherein:

FIGURE 1 is a diagrammatic representation of a machine incorporating the invention and FIGURE 2 depicts one form of vibratable screen suitable for use in the invention.

As shown in FIGURE 1 of the drawings a screen 1 may be supported by the frame 3 of a machine generally designated by the numeral 2. A hydraulic motor 4, mounted on springs 5, serves to vibrate the screen 1. Binder material, e.g. bitumen emulsion, may be fed from a manifold 6 through a flexible hose 7 to the screen 1. The frame 2 may be moved by suitable means, e.g. by wheels, rollers, or cylinders 8 and 9. Members 8 and 9 are preferably cylinders which may contain a controllable amount of water so that buoyancy can be adjusted. The machine 2 may be either towed e.g. by a vessel, vehicle, or winch, or moved under its own power, e.g. by a second hydraulic motor actuating the supporting members 8 and 9. The machine 2 is adapted to move over the surface of the bed 10, lying below the water, e.g. the sandy bed of a river or an estuary with the screen 1 located a short distance below the bed surface. The screen 1 is vibrated by the motor 4 producing a fluidised bed of sand particles into which the binder is directly injected and, as the machine 2 moves in the direction designated by the arrow, a mass 11 of stabilised material, e.g. compacted river sand, remains behind the screen. Where the bed contains stones, or other debris, these may be removed by suitable means such as a rotating harrow preceding the screen.

FIGURE 2 shows a form of the screen 1 suitable for use in the invention. The screen as shown in FIGURE 2, comprises an inter-communicating pipe system comprising upright pipes 12 and horizontal pipes 13, the latter being provided with orifices 14. In operation binder material is fed to the screen through one or more of the upright pipes 12 and is delivered through the orifices 14 to the fluidised mass of sand produced by the vibration of the screen in the sand bed. The vibration efficiency of the screen can be improved by attaching, e.g. a mesh (indicated by "a") or pins (designated by "b") to the screen, or by other means; these devices, preferably, are removably attached to facilitate replacement.

Any suitable binding material that can be applied in a fluid state and that will bind the bed material to which it is applied, may be used. As previously stated a bitumen binder is preferred for stabilising underwater beds, more particularly an acidic bitumen emulsion. An example of such an emulsion is a quick-breaking cationic emulsion comprising 60% of a 200 penetration bitumen, 0.5% of an amine emulsifier, e.g. Dinoram S diamine, and 0.9% concentrated HCl (all parts being by weight). In order that the binder may flow freely to the position of application the emulsion is suitably diluted, e.g. one part of bitumen emulsion being diluted with from one to three parts of water.

The vibratory screen or grid is suitably arranged to be raised or lowered and, in operation, is lowered to its running position, e.g. a few inches below the bed surface and moved along the bed as required, the binder being squirted into the fluidised bed material, preferably in a direction opposite to the direction of travel of the screen or grid, although orifices may be placed on both faces of the screen. The rate of travel of the screen supporting machine is adjusted to provide a desired binder content of the coated material, e.g. it has been found that about 6% by weight of bitumen, on the dry weight of coated sand, may be obtained with a rate of travel of about 3 feet per minute, using a vibrator oscillating vertically at 50 cycles per second, when the vibrator is a grid about 6 x 4 inches of ¼-inch piping pierced with $\frac{1}{32}$-inch holes on its reverse face; laboratory tests have shown that this proportion of binder provides good resistance to water flow at 5 feet per second.

Although the invention has been more specifically described with reference to its application to the stabilisation of sandy beds of watercourses, it may, as previously mentioned, be applied generally for compacting non-cohesive materials by fluidising them under a supernatant liquid and applying a binder to the fluidised material. One example of such further application is in the preparation of foundation beds to receive supports, such as piles, for structures such as piers, or indeed of buildings; application to this latter purpose is particularly useful where the earth structure is weak and subsidence is liable to occur, e.g. when building on re-claimed land of a marshy character. In this application of the invention the vibrating means will be selected to travel vertically, to form a core of compacted material and, if the bed structure is of an inherently weak character, bed material may be removed and replaced with material such as sand, water being injected, if the operation is conducted on substantially dry land, to provide the supernatant liquid.

A further example of the application of the invention is in the formation of agglomerates from coal fines, such as briquettes, by compacting the fines with a suitable binder, e.g. a bitumen or coal tar emulsion. Other examples of applications of the invention will be readily apparent, e.g. in the application of binders such as resin, or rubbery polymers, to non-cohesive mineral powders or non-cohesive vegetable material such as sawdust or wood flour.

It will be appreciated that the binding material will be selected according to the application of the invention and that it may be applied, as appropriate, as an emulsion or in solution; also the supernatant liquid may, in some cases, be organic in nature.

As previously mentioned the fluidising vibrations may be produced by any suitable known means and, examples of means additional to those beforementioned, are ultrasonic vibrations and electro-magnetic fields.

What is claimed is:

1. Apparatus for stabilizing a subsurface layer of a bed of non-cohesive granular material which comprises:
   (a) carriage means arranged for translatory movement over the surface of a non-cohesive granular material;
   (b) injection means for introducing a binder solution into a layer of material below the surface of the bed of granular material;
   (c) means mounting said injection means to said carriage means such that the injection means is located below the surface of the bed of granular material; and
   (d) means for imparting movement to said injection means and thereby fluidizing the surrounding granular material of a bed of granular material below the surface thereof without fluidizing the surface material.

2. The apparatus in accordance with claim 1 wherein the injection means is a screen having a vertical array of substantially horizontally disposed conduits, said conduits having apertures therein and the means for imparting movement to said screen to fluidize the subsurface granular material is a high frequency vibration means.

3. The apparatus in accordance with claim 2 which further comprises auxiliary fluidization means attached to said screen for vibration therewith thereby improving the fluidization of the subsurface layer of non-cohesive granular material.

4. The apparatus in accordance with claim 3 in which the auxiliary fluidization means is a mesh means attached to the screen.

5. The apparatus in accordance with claim 3 in which the auxiliary fluidization means is a series of pins attached to the screen.

6. The apparatus in accordance with claim 2 in which the auxiliary fluidization means is removably attached to said screen.

7. The apparatus in accordance with claim 2 in which the carriage means is self-propelled.

8. A method of stabilizing a subsurface layer of a bed of non-cohesive granular material which comprises:
   (a) fluidizing, at a depth below the surface layer of a non-cohesive granular material sufficient to minimize disturbance of said surface layer, a first portion of a subsurface layer of a non-cohesive granular material;

(b) applying a binder material directly to the fluidized material; and (c) subsequently fluidizing and applying the binder material to a second portion of a subsurface layer of granular material to form a continuous stabilized subsurface layer.

9. A method as in claim 8 wherein the fluidizing is accomplished by a high frequency vibration means.

10. A method as in claim 9 in which the fluidization of the subsurface granular material and the application of the binder material occurs simultaneously.

11. A method as in claim 9 in which the binder material is bitumen.

12. A method as in claim 11 in which the bitumen is in the form of an emulsion.

13. A method as in claim 12 in which the bitumen is an acidic emulsion.

14. A method as in claim 9 in which the non-cohesive granular material, the subsurface layer of which is stabilized, is disposed beneath supernatant liquid.

15. The method as in claim 14 in which the non-cohesive granular material is the underwater bed of a watercourse.

References Cited

UNITED STATES PATENTS

| | | | |
|---|---|---|---|
| 2,190,003 | 2/1940 | Van Hulst | 61—36 |
| 2,196,211 | 4/1940 | Hartman | 61—36 |
| 2,229,912 | 1/1941 | Baily | 61—35 X |
| 2,474,937 | 7/1949 | Feeley | 94—48 |
| 3,130,552 | 4/1964 | Bodine | 61—36 |

JACOB SHAPIRO, *Primary Examiner.*